Fig. 4.

Inventor:
Mervin W. LaRue, Jr.
By
Attys.

Dec. 4, 1962
M. W. LA RUE, JR
3,066,587
AUTOMATIC EXPOSURE CONTROL WITH AN
INTERMITTENT NEEDLE ENTRAPMENT
Filed Dec. 16, 1958
6 Sheets-Sheet 5

United States Patent Office 3,066,587
Patented Dec. 4, 1962

3,066,587
AUTOMATIC EXPOSURE CONTROL WITH AN
INTERMITTENT NEEDLE ENTRAPMENT
Mervin W. La Rue, Jr., Barrington, Ill., assignor to Bell &
Howell Company, Chicago, Ill., a corporation of
Illinois
Filed Dec. 16, 1958, Ser. No. 780,716
4 Claims. (Cl. 95—10)

This invention relates to apparatus for adjusting the exposure of a photographic camera to provide proper exposure of the film therein under different light conditions, and has for its general object the provision of a new and improved apparatus of this character.

More particularly this invention is directed to an improved apparatus for automatically varying the area of the diaphragm opening within a motion picture camera as a function of the available light about the camera.

Heretofore, many and varied means have been devised for controlling the size of the diaphragm opening for selectively restricting and enlarging the cross-sectional area of the light passage intermediate the light receiving aperture in the camera and the film to be exposed. Such means generally comprise a plurality of iris members which are selectively movable to restrict or enlarge the diaphragm opening and which may be automatically or manually adjusted. Generally, such automatic control systems comprise a photoelectric cell, a galvanometer electrically connected to the photoelectric cell, a rotary meter coil associated with the galvanometer and rotatable as a function of the electrical energy derived from the photoelectric cell, and some form of gear means interconnecting the rotatable meter coil with the iris members to pivotally move the iris members to thereby vary the area of the diaphragm opening as a function of the intensity of light impinging on the photoelectric cell.

Since automatic exposure control mechanisms of the type described above generally comprise a plurality of interconnected rotary members, it has generally been found advantageous, if not necessary, to both statically and inertially balance the control system to render the system substantially insensitive to movements of the photographic camera itself. Obviously, however, inertially and statically balancing the rotative members in a diaphragm opening control mechanism is a relatively difficult task necessitating the formation of the various movable members therein within relatively close tolerances and the expenditure of considerable labor.

In view of the foregoing and in order to obviate the disadvantageous characteristics of such automatically operable diaphragm opening control mechanisms, applicant hereinafter sets forth with particularity an automatically operable diaphragm opening control mechanism which need not be either inertially or statically balanced and which may be relatively economically produced but which, nonetheless, is effective to render the cooperating iris members defining the diaphragm opening relatively insensitive to movements of the photographic camera itself.

Applicant's diaphragm opening control mechanism comprises generally an adjustable diaphragm iris having a plurality of collapsible iris blades therein and having a cam ring which is rotatable to move the cooperating iris blades to vary the area of the diaphragm opening and means for automatically rotating the cam ring to vary the area of the diaphragm opening as a function of the intensity of light to which the camera is exposed. The iris diaphragm adjusting means comprises generally a geared shaft which is drivingly connected with the cam ring of the iris diaphragm, a ratchet drive mechanism for intermittently rotating the geared shaft, and a light responsive mechanism operable to selectively engage and disengage the ratchet drive mechanism from the geared shaft. The light responsive mechanism, in turn, comprises generally a photoelectric cell, a galvanometer having a pivoted meter coil associated therewith rotatable as a function of the electrical energy derived from the photoelectric cell, and means operatively associated with the rotatable meter coil for determining the positioning of the ratchet drive mechanism with respect to the geared shaft.

An important feature of the present invention is that the ratchet drive mechanism incorporated within the diaphragm opening control mechanism is arranged to controllably move the cam ring associated with the diaphragm iris to both the aperture open and aperture closed positions so that, unlike the normal practice in the photographic art, the iris blades are positively driven in both directions and are not merely spring urged in one direction.

It will hereafter become apparent that in an automatic diaphragm opening control mechanism including a ratchet drive mechanism of the type hereinafter to be disclosed more fully in detail, it is unnecessary to statically balance the movable components in the mechanism or to inertially balance the system itself to prevent movement of the iris members upon movement of the camera body.

Accordingly, it is a principal object of the present invention to provide an improved means for adjusting the diaphragm opening in a photographic camera.

Another object of the present invention is to provide an improved means for adjusting the diaphragm opening in a photographic camera which is substantially insensitive to movements of the camera itself but which need not be either inertially or statically balanced.

A further object of the invention resides in the provision of a novel ratchet drive mechanism for rotating the cam ring in a diaphragm iris to regulate the area of the diaphragm opening defined by the cooperating iris blades within the diaphragm iris as a function of the intensity of light to which the camera is subjected.

These and other objects of the invention will become apparent from time to time as the following specification proceeds and with reference to the accompanying drawings, wherein.

Figure 1:
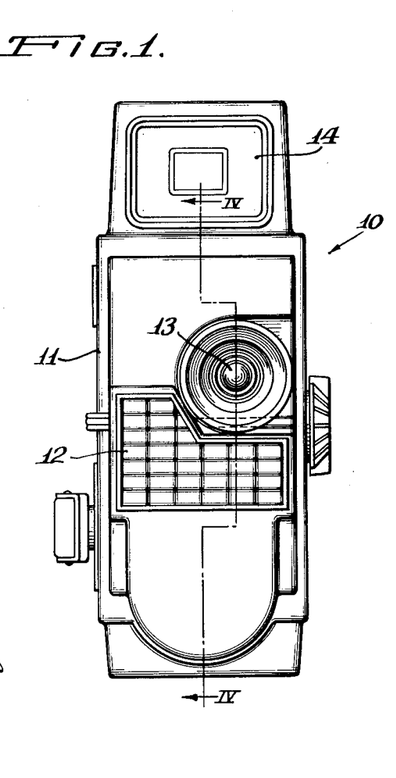
FIGURE 1 is a front elevational view of a motion picture camera constructed in accordance with the principles of the present invention.
Figure 2:
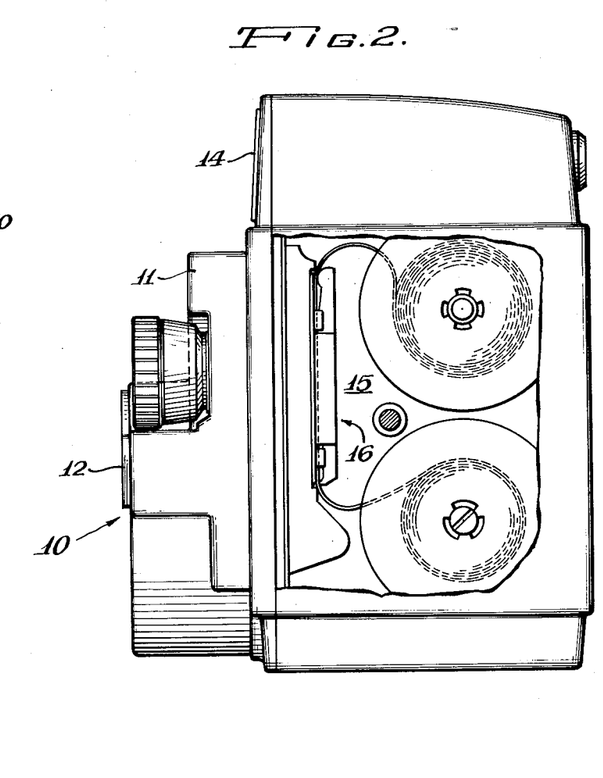
FIGURE 2 is a side elevational view of the camera illustrated in FIGURE 1 with a portion of the side wall thereof broken away to illustrate the film chamber with the rotatable film spools therein.
Figure 4:
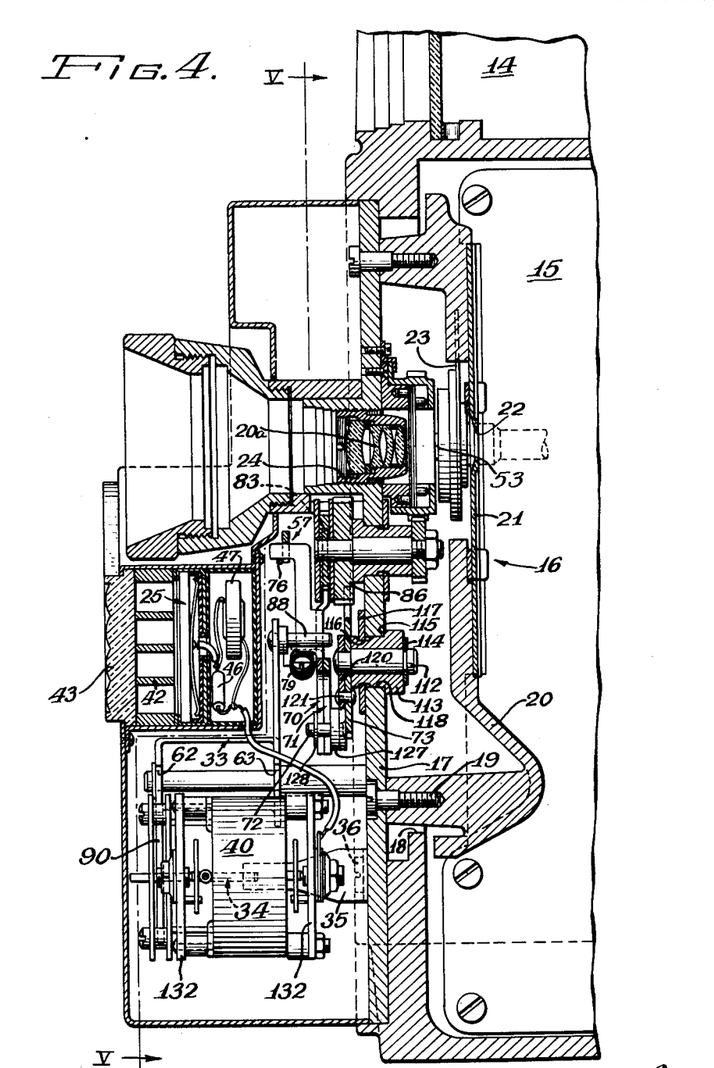
FIGURE 4 is a vertical sectional view through the camera illustrated in FIGURES 1 and 2 and taken along lines IV—IV of FIGURE 1.

In the portion of the invention illustrated, particularly in FIGURES 1, 2, and 4, there is shown a motion picture camera 10, which per se is of standard design and which includes generally a casing 11 having a photoelectric eye 12, a lens 13, and a view finder 14 associated therewith. The casing 11 serves to enclose the mechanism of the camera and provides a film chamber 15 therein within which are arranged two spaced rotatable film spools and a vertical exposure guide 16 arranged at the front portion of the film chamber 15.

The front wall 17 of the camera casing 11 comprises a separate part detachably secured in a shouldered opening 18 in the front of the main casing 11 by headed screws 19 screw-threaded rearwardly into a frame part 20 fixed within the main casing portion 11.

The exposure guide 16 comprises a front guide plate 21 which is secured within the casing on the frame part 20 in rearwardly spaced relation with the front wall 17. Film is guided against the rear face of the guide plate 21 and the guide plate is provided with a forwardly facing horizontally elongated rectangular exposure aperture 22, conforming with a standard motion picture frame through which successive frames of the film are exposed as the film is intermittently fed through the exposure guide. It will further be noted that a rotary shutter 23 is positioned immediately in front of the guide plate and is rotated in timed relation with the intermittent feed of the film to cover the exposure aperture 22 during the film feed intervals as is usual.

The front wall 17 is also provided with a lens opening 24 with which the exposure aperture 22 is aligned and a suitable photographic lens 24a is mounted on the front wall within the lens opening, and in alignment with the exposure aperture, for forming images on the film at the exposure aperture.

Figure 3:
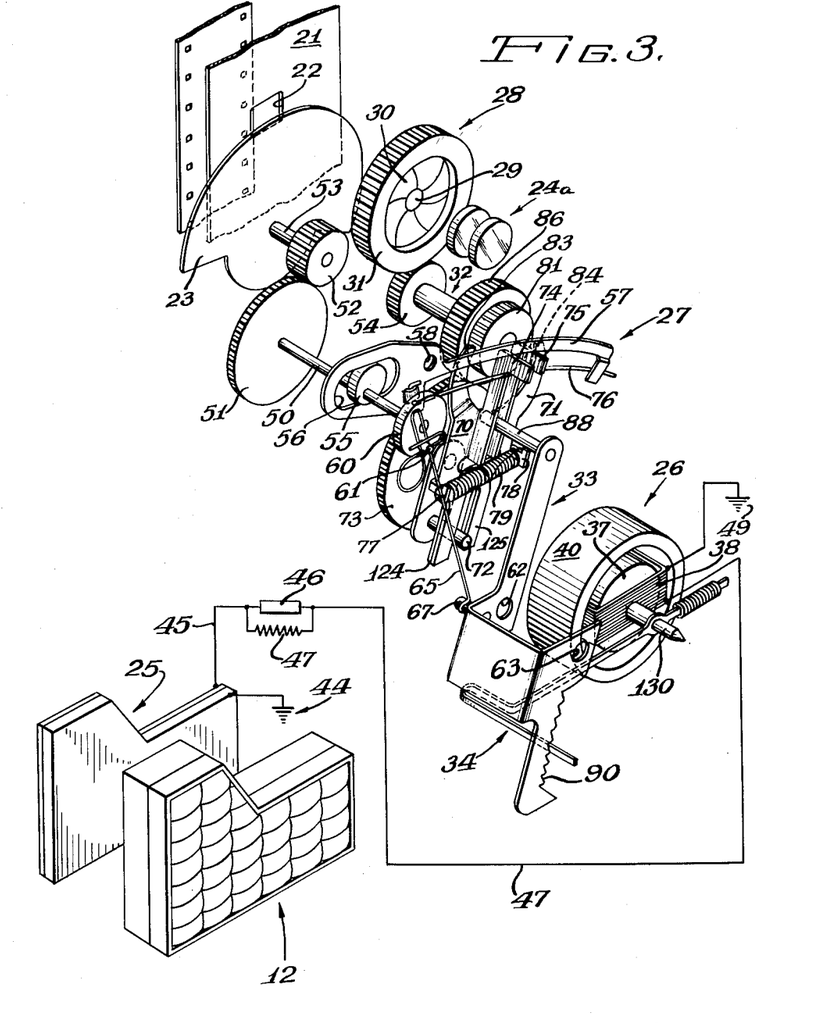
FIGURE 3 is an exploded pictorial view of the exposure control mechanism of the present invention together with parts of the camera related thereto and including the circuit diagram of the control.

As shown in the diagrammatic representation of the diaphragm opening control mechanism of the present invention illustrated in FIGURE 3, a photoelectric cell 25 is electrically connected with a galvanometer 26 which is, in turn, associated with the mechanical linkage 27 of the diaphragm opening control mechanism and the iris diaphragm 28 which serves to define and vary the area of a diaphragm opening 29. The diaphragm iris 28 includes, in addition to the iris blades 30, which serve to define the diaphragm opening 29, a cam ring 31 which is rotatable in opposite directions to move the cooperating iris blades 30 to vary the area of the diaphragm opening 29 defined thereby. The cam ring 31 is adjustably rotated through a gear shaft 32 which is, in turn, rotated by a ratchet drive mechanism, the movement of which is controlled by pivotal movement of a lever 33. An entrapment needle 34 is associated with the galvanometer 26 and is cooperable with a portion of the lever 33 to limit movement thereof in a manner which will hereinafter be described more fully in detail.

The galvanometer 26 is suitably secured to the front wall 17 by means of a bracket 35 of non-magnetic material which is suitably affixed to the galvanometer 26 and which is, in turn, secured to the front wall 17 by means of screws 36. The galvanometer 26 is of usual construction and comprises a central cylindrical permanent magnet 37 (see FIGURE 3), a pivoted rectangular circuit coil 38 surrounding the magnet 37 and spring biased to a zero position by spiral springs 39 (see FIGURE 4), and a ring 40 of magnetic material surrounding the coil and serving to concentrate the magnetic field of the magnet. The galvanometer is so positioned that the pivotal axis of the coil is normal to the plane of the exposure aperture 22.

The forwardly facing photoelectric cell 25 is mounted in the casing 11 below the lens 25a on a supporting plate 41 affixed to the casing 11 and has the usual light controlling baffle 42 disposed in front of the cell and the usual reticular lens 43 secured in front of the baffle by suitable securing means. The circuit coil of the galvanometer is connected in circuit with the photoelectric cell 25 so that the coil is deflected from its spring biased zero position by current derived from the photoelectric cell in proportion to the intensity of light impinging on the photoelectric cell. The photoelectric cell and galvanometer circuit comprise one terminal of the photoelectric cell which is connected, as designated at 44 to the metal framework of the mechanism which framework is for convenience referred to as "ground," the other terminal of the coil is connected by a conductor 45 to one terminal of a resistor 46 and with a resistor 47, which is connected in shunt with the resistor 46, the other terminals of these resistors are connected by a conductor 47 to one terminal of the circuit coil 38 of the galvanometer 26, and the terminal of this coil is connected to ground as designated at 49.

The purpose of the resistors 46 and 47 is to compensate for the positive temperature coefficient of resistance of the photoelectric cell on the galvanometer circuit per se, so that the deflection of the circuit coil 38 is approximately uniform throughout the range of temperature normally encountered in use, as from 0 to 100° F. For this purpose, the resistor 46, commercially known as a thermistor, has a negative temperature coefficient of resistance greater than the positive temperature coefficient of resistance of the photoelectric cell and galvanometer circuit per se, and the resistor 47, serving as a modifying resistor, has a temperature coefficient of resistance lying between the positive temperature coefficient of resistance of the photoelectric cell and galvanometer circuit per se and the negative temperature coefficient of resistance of the thermistor 46, the characteristics of these resistances being selected to obtain the aforesaid compensation, as fully described and claimed in copending application for U.S. patent of Mervin W. LaRue, Jr., and William W. Whightman, Serial No. 628,753, filed December 17, 1956, for "Exposure Control for Photographic Cameras," now Patent No. 2,996,965, issued Aug. 22, 1961, and assigned to the assignee hereof.

Referring now particularly to FIGURE 3 of the drawings, it will be noted that the rotary shutter 23 is moved in a counter-clockwise direction through a spring wound power source (not shown) and that a large diameter gear 51 affixed to one end of a shaft 50 drivingly engages a small diameter gear 52 on a shaft 53 to provide a means for rotatably driving the shaft 50 in a clockwise direction. The adjusting ring 31 of the iris diaphragm 28 has a plurality of gear teeth formed in the outer peripheral edge thereof which drivingly engage a small diameter gear 54 affixed to one end of the geared shaft 32 and is so arranged that rotatable movement thereof acts to vary the area of the diaphragm opening defined by the iris blades 30 as is usual. Accordingly, rotation of the geared shaft 32 in opposite directions tends to rotate the cam ring 31 of the iris diaphragm 28 in opposite directions to thereby vary the area of the diaphragm opening 29.

It will further be apparent that a cam lobe 55 is affixed to the drive shaft 50 for corotatable movement with respect thereto and that the cam lobe is arranged to move within an elongated aperture 56 in a mechanicl transducer 57 which, in turn, is pivoted about an axis extending through an aperture 58 formed therein and spaced transversely from the elongated aperture 56. A drive wheel 60 is affixed to the opposite end of the shaft 50 from the large diameter gear 51 and has a pin 61 positioned eccentrically on the outer face thereof which is arranged to intermittently rotate the lever 33 about its pivotal axis which extends through oppositely disposed apertures 62 and 63 formed therein. To effect such pivotal movement of the lever 33, a resilient drive member 65 interconnects the eccentric pin 61 with a similar pin 67 which is affixed to the lever 33.

A pair of ratchet members 70 and 71 are pivotally mounted about a motion translation pin 72 which is indirectly connected to a large diameter spur gear 73 for corotatable movement therewith and are each formed with inturned ears 74 and 75, respectively, at the upper ends thereof which are slidable along a spring member 76 forming a portion of the mechanical transducer 57. Inturned tabs 77 and 78 are formed on the members 70 and 71, respectively, and serve as mounting means for the opposite ends of a spiral spring 79 which, in turn, urges the members 70 and 71 toward one another.

A ratchet gear 81 is affixed to the opposite end of the gear shaft 32 from the gear 54 and has a plurality of peripheral teeth thereon which are arranged to be drivingly engaged by one way ratchet ears 83 and 84 formed integrally with the members 70 and 71 at the upper ends thereof. It will thus be observed that when one of the ratchet members, such as the ratchet member 83, is moved into driving engagement with the peripheral teeth on ratchet gear 81, upward movement of the outer free end of the mechanical transducer 57 about its pivotal axis 58 through the action of the rotational movement of cam lobe 55 will effect upward movement of members 70 and 71 through co-action of the ears 74 and 75 with the spring member 76 to thereby effect clockwise rotary drive movement of the gear 81 to rotatably move the shaft 32 in a clockwise direction to thereby effect counter-clockwise rotatable movement of the adjusting ring 31. In the embodiment of the invention illustrated and described herein, such counter-clockwise rotary movement of the adjusting ring 31 is effective to decrease the area of the diaphragm opening 29 defined by the iris blades 30.

A relatively large diameter gear member 86 is also affixed to the gear shaft 32 for corotatable movement with respect thereto and has a plurality of peripheral teeth formed therein which are arranged to drivingly engage the peripheral teeth on gear member 73 to rotatably move the gear 73 to thereby vary the relative rotated position of the motion translation pin 72.

Another pin 88 is affixed to the upper free end of the lever 33 and is normally positioned between and in engagement with the members 70 and 71. When the lever 33 is rotated in a clockwise direction about the pivotal axis extending through the apertures 62, 63, member 71 is also pivoted in a clockwise direction about the pin 72 and the ratchet tooth 83 formed integrally with the member 70 is urged into engagement with the peripheral teeth on ratchet gear 81 through the biasing force of spring member 79. As a result, when the mechanical transducer 57 is pivoted in a counter-clockwise direction about its axis 58 by cam 55, the upward movement of the outer free end thereof will cause the member 70 to rotatably move ratchet gear 81, and accordingly gear shaft 32, in a clockwise direction. Such clockwise movement of the geared shaft 32 will effect counter-clockwise movement of the spur gear 73 to position the motion translation pin 72 in a clockwise rotated position from its former position. If the pin 88 is maintained in the same clockwise rotated position, the ratchet tooth 83 on member 70 will continue to engage and rotatably move ratchet gear 81 during each revolution of the shaft 50 until the motion translation pin 72 is brought into alignment with gear shaft 32 and pin 88.

As hereinbefore noted, the lever 33 is urged to move pivotally about an axis extending through the apertures 62, 63 by the transmission of force from the drive wheel 60 to the lever 33 through the resilient drive member 65. It will, however, be observed that a needle 34 is affixed to the pivoted rectangular circuit coil 38 of the galvanometer 26 for corotatable movement with respect thereto and that the outer free end thereof is cooperable with a stepped cam face 90 on the lever 33 to act as a stop therefor, to limit counter-clockwise rotatable movement of the lever 33 about its pivotal axis.

Figure 5:
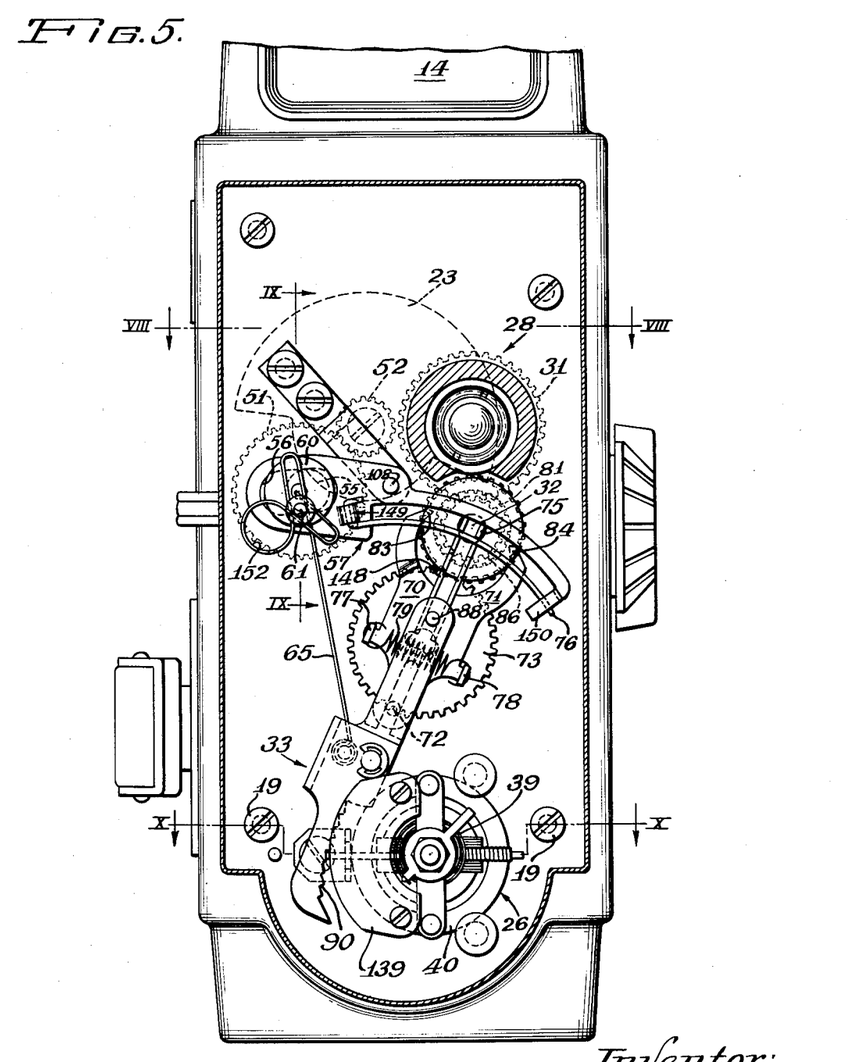
FIGURE 5 is a fragmental front elevational view of the diaphragm opening control mechanism constructed in accordance with the principles of the present invention showing the front face of the camera removed which is taken substantially along lines V—V of FIGURE 4.

As viewed most clearly in FIGURE 5, it will be noted that the high point of the cam lobe 55 is angularly displaced about 80° in a counter-clockwise direction behind the pin 61 so that counter-clockwise pivotal movement of the lever 33 will not be effected until the outer free end of the mechanical transducer 57 has completed its upward stroke. In this manner, no ratcheting of the gear 81 will be effected while the lever 33 is out of engagement with the entrapment needle 34. Accordingly, if the intensity of light impinging on the photoelectric cell 25 remains constant and if it be assumed that the drive shaft 50 is rotating at a constant speed and assuming that the geared shaft 32, the pin 88, and the pin 72 are in alignment with one another, neither of the ratchet ears 83 or 84 will be in driving engagement with the ratchet gear 81 during upward movement of the outer free end of the mechanical transducer 57 so that the shaft 32 will remain unmoved and the area of the diaphragm opening will remain constant.

On the other hand, when the intensity of light impinging on the photoelectric cell 25 increases, the increased electrical energy transmitted to the meter coil 38 will urge the meter coil and the entrapment needle 34 associated therewith to move in a clockwise direction but such movement will be prevented as long as the lever 33 engages it. Clockwise rotational movement of the drive wheel 60 from the position illustrated in FIGURE 3 will then be operative to initially decompress the resilient drive member 65 and thereafter pivotally move the lever 33 in a clockwise direction about its axis extending through apertures 62, 63. When the lever 33 has moved out of engagement with the entrapment needle 34, the needle will then move in a clockwise direction and further rotatable movement of the drive wheel 60 will act, through the resilient drive member 65 to move the lever 33 in a counter-clockwise direction about its pivotal axis until the stepped cam face 90 has again moved back into engagement with the entrapment needle 34. At this time the cam lobe 55 will then be rotated to such a position as to begin moving the free end of the mechanical transducer in an upward direction to effect ratcheting movement of the gear 81. The ratchet ear 83 formed integrally with thhe member 70 engaging the ratchet wheel 81, rotatably moves the same in a clockwise direction thereby effecting counter-clockwise rotatable movement of the adjusting ring 31 of iris diaphragm 28 to decrease the area of the diaphragm opening 29 defined by the iris blades 30. Such ratcheting movement will continue until the spur gear 73 has been rotated in a counter-clockwise direction to again position the pin 72 in alignment with the pin 88 and drive gear 32 in a manner and for reasons which will hereinafter become more fully apparent.

Similarly, when the intensity of light impinging on the photoelectric cell 25 decreases, the galvanometer springs (not shown in FIGURE 3) will effect counter-clockwise rotatable movement of the pivoted rectangular circuit coil 38 and the needle 34 so that when the drive wheel 60 has rotated to the position illustrated in FIGURE 3, the lever 33 will be rotated to a greater counter-clockwise rotated position to thereby move the member 70 out of engagement with the ratchet wheel 81 and to simultaneously move the ear 84 formed integrally with the member 71 into driving engagement with the ratchet wheel 81 to rotatably move the geared shaft 32 in a counter-clockwise direction until the spur gear 73 has been rotated in a clockwise direction a distance sufficient to again position the pin 72 in alignment with the shaft 32 and pin 88, to thereby rotatably move the adjusting ring 31 of the iris diaphragm 28 in a clockwise direction to enlarge the area of the diaphragm opening 29 defined by the iris blades 30.

Figure 8:
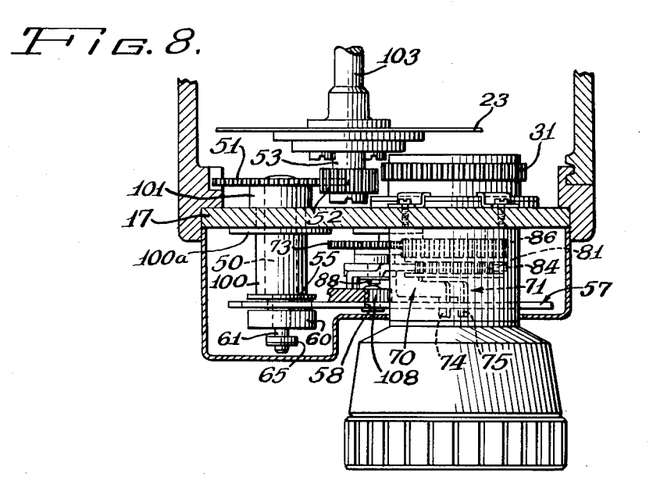
FIGURE 8 is a fragmental horizontal sectional view of a portion of the diaphragm opening control mechanism which is taken along lines VIII—VIII of FIGURE 5.

Referring now more particularly to FIGURE 8 for a more detailed description of the illustrated embodiment of the invention, it will be noted that the drive shaft 50 is journaled within a cylindrical bearing 100 and that the bearing is, in turn, seated within a suitable receiving aperture in the front wall 17 of the camera and is maintained therein by a retaining ring 100a. A suitable spacer 101 serves to maintain the drive wheel 51 in suitable spaced relation from the front wall 17 and in driving engagement with the gear 52 so that rotatable movement of the rotary shutter 23 will effect rotary movement of the drive wheel 51 through the shaft 53. The rotary shutter 23 and the shaft 53 are, in turn, supported within the camera by means of a shaft 103 journaled in the frame part 26 which is connected in a manner not shown with the spring wound power source for the camera.

Figure 9:
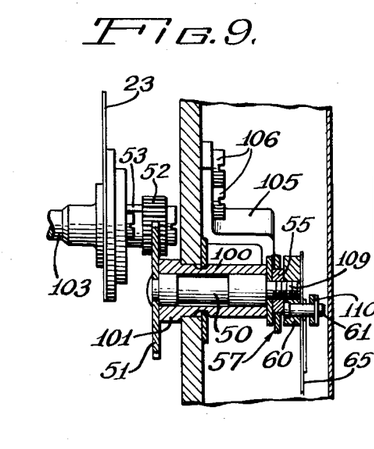
FIGURE 9 is a fragmental vertical sectional view of a portion of the diaphragm opening control mechanism which is taken along lines IX—IX of FIGURE 5.

As illustrated most clearly in FIGURES 8 and 9, a supporting bracket 105 is secured to the front wall 17 by a plurality of screws 106 with its outer free end portion formed in spaced relation from the front wall 17 through which a pin or rivet 108 extends to pivotally mount the mechanical transducer 57 within the camera. The cam lobe 55, about which fits the elongated aperture 56 formed within the mechanical transducer 57, is screw-threaded on the radially reduced threaded end portion 109 of the shaft 50 as is the drive wheel 60. The spring wire drive member 65 is fitted on the motion translation pin 61 in the manner illustrated in FIGURE 3 and a retaining ring 110 is forced on the outer end of the pin 61 to maintain the spring wire member 65 in its proper position on the pin 61.

Referring now to FIGURE 4 of the drawings, it will be noted that the spur gear 73 is affixed to the outer end portion of a shaft 112 which is journaled within a suitable bearing 113, and which is retained therein by means of a retaining ring 114 abutting one end of the bearing 113. It will also be noted that a shoulder 115 formed annularly within the bearing 113 is arranged to abut the rear face of the front wall 17 and that the bearing is suitably annularly grooved as at 116 to provide a means for seating a retaining ring 117 which serves to position the bearing 113 rigidly within the aperture 118 in the front wall 17.

A plate 120 is seated on the front face of the spur gear 73 and about the radially reduced outer end portion of the shaft 112 and is further secured to the gear 73 by means of a rivet 121 extending through the plate and gear to thereby affix the plate 120 to the gear 73 for corotatable movement therewith. It is to be understood that the plate 120 extends exteriorly of the circumference of the gear 73 to increase the radial distance from the center axis of the gear 73 to the motion translation pin 72 affixed to the plate 120. The members 70 and 71 are pivotally and slidably mounted on the pin 72 by means of the U-shaped legs 124 and 125 thereof and are maintained in position on the pin 72 by means of a spacer 127 and a retaining ring 128.

Figure 10:
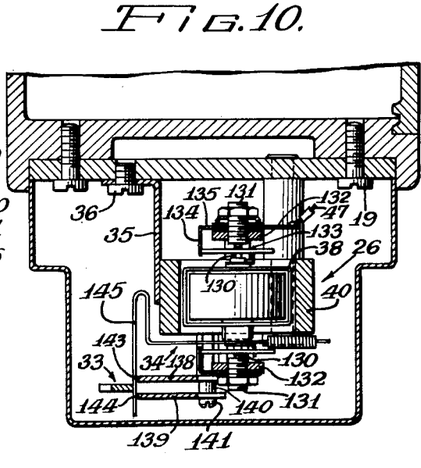
FIGURE 10 is another fragmental horizontal sectional view of a portion of the diaphragm opening control mechanism which is taken along lines X—X of FIGURE 5.

With particular reference to FIGURES 4, 5 and 10, it will be noted that the rotatable rectangular circuit coil 38 is mounted for pivotal movement on a pair of oppositely disposed spindles 130 and that the spindles have conically shaped outer end portions which are arranged to be received within suitable jeweled bearings formed in threaded adjusting screws 131 which are, in turn, mounted in oppositely disposed bridges 132. Arms 133 are suitably secured to the pivoted rectangular circuit coil for corotatable movement with respect thereto adjacent each spindle and are affixed, as by soldering or the like, to one end of each of the spiral springs 39 which, in turn, have their opposite ends similarly secured to the depending ends 134 of adjusting members 135. Accordingly, and as viewed in FIGURE 5, the spiral springs 39 tend to bias the pivoted rectangular circuit coil 38 in a counter-clockwise direction and the biasing force thereof may be manually preselected by adjusting the members 135.

A pair of entrapment members 138 and 139 are suitably spaced from one another by a cylindrical spacer 140 and are secured to the ring 40 of the galvanometer 26 by a screw 141 screw-threaded therein through the spacer 140 and are maintained in position thereby with their arcuate edges 143 and 144, respectively, in congruent relation with respect to one another. The edges 143 and 144 are so formed and the members 138 and 139 are so positioned that the depending leg 145 of the entrapment needle 34 is pivotally movable about an axis extending through the spindle 130, along the edges 143 and 144 in juxtaposed relation therewith.

It will thus be apparent that when the lever 33 has rotated to the position illustrated in FIGURE 5 that the depending leg 145 of the entrapment needle 34 will be pinched between the stepped cam surface 90 of the lever 33 and the arcuate edges 143, 144 of members 138, 139.

Each of the members 70 and 71 has in addition to its U-shaped legs and its ratchet ear, an outturned flange 147 with which the ear 75 is integrally formed. The pin 88 connected to the lever 33, at the upper free end thereof, is positioned intermediate each of the outturned flanges 147 so that rotatable movement of the lever 33 in a counter-clockwise direction, for instance, will pivot the member 70 about the pin 72 in a counter-clockwise direction away from the ratchet gear 81. This movement of the member 70 will act to pull the member 71 in a counter-clockwise direction about the pin 72 to move the ratchet ear 84 into engagement with the ratchet gear 81 due to the connection of the spring 79 intermediate the outturned nibs 77 and 78 formed integrally with the members 70 and 71, respectively.

The spring wire member 76 is affixed to one end of the mechanical transducer 57 as at 149 but has its opposite end freely, slidably seated on a depending leg 150 of the mechanical transducer 57 so that the members 70 and 71 will not be subjected to shock loads when the mechanical transducer 57 pivots about the pin 108.

Also, the resilient drive member 65 is formed with a loop 152 intermediate the points of connection of the member 65 with pins 61 and 67 to prevent stalling of the shaft 50 after the lever 33 has moved into abutment with the entrapment needle 34. Thus, rotation of the drive wheel 60 will act to initially move the lever 33 in a counter-clockwise direction until the lever has moved into abutment with the leg 145 of the entrapment needle 34 and, thereafter, further rotation of the drive wheel 60 will act merely to enlarge the circumference of the loop 152 thereby increasing the compressive force on the resilient drive member 65 and pinching the needle 34 between the lever 33 and arcuate edges 143, 144.

Assuming that the shutter 23 is being rotated at a constant speed by the power source (not shown) and that the intensity of light impinging on the photoelectric cell 25 is substantially constant, the operation of a camera embodying the principles of the present invention will be generally as follows: Rotation of the shutter 23 will effect rotatable movement of the shaft 50 through the driving engagement between gear wheels 51 and 52 so that the cam lobe 55 mounted on the shaft 50 will be effective to oscillate the mechanical transducer 57 about the pin 108. Since the pin 61 on the drive wheel 60 is angularly displaced approximately 80° from the major axis of the cam lobe 55, the lever 33 will not be urged, through the resilient drive member 65, to move pivotally about its axis until the cam 55 has initiated downward movement of the outer free end of the mechanical transducer 57.

In this connection it will be noted that the outer free end portion of the mechanical transducer 57 is urged to move in a downward direction during that interval when the cam lobe 55 rotates 180° through the third and fourth quadrants and, similarly, that the lever 33 is urged to move in a clockwise direction about its pivotal axis only during that interval when the pin 61 rotates through the first and second quadrants. Accordingly, when the cam lobe 60 begins to effect upward movement of the outer free end of the mechanical transducer 57 the lever 33 will already have been moved back into engagement with the entrapment needle 34 (that is, to the position illustrated in FIGURE 5) and neither of the ratchet ears 83 or 84 will be in engagement with the ratchet wheel 81 so that upward movement of the outer free end of the mechanical transducer 57 will not be effective to rotate the gear shaft 32. As a result, neither the spur gear 73 nor the adjusting ring 31 of the iris diaphragm will be moved so that the area of the diaphragm opening 29 defined by the iris blades 30 will remain constant with continued oscillation of the transducer 57.

Upon an increase in the intensity of light impinging on the photoelectric cell 25, however, the area of the diaphragm opening 29 defined by the iris blades 30 will be reduced in the following manner: Rotation of the drive wheel 60 will act through the resilient drive member 65 to pivotally move the lever 33 about its pivotal axis to thereby lift the stepped cam face 90 out of engagement with the entrapment needle 34 during that interval when the outer free end of the mechanical transducer 57 is moving downwardly. Such clockwise rotatable movement of the lever 33 will move the member 71 away from the ratchet wheel 81 and will consequently move the ratchet ear 83 of member 70 into engagement with the ratchet wheel 81. No ratcheting of the wheel 81 will be effected, however, while the outer free end of the mechanical transducer 57 is moving in a downward direction since each of the ears 83 and 84 is only arranged to rotatably move the ratchet wheel 81 when they are being moved in an upward direction by the mechanical transducer 57. The ear 83 will simply slide over the peripheral teeth on gear 81. As soon as the stepped cam face 90 of the lever 33 has moved out of engagement with the entrapment needle 34 the needle will be moved rotatably in a clockwise direction by the electrical energy derived from the photoelectric cell 25 against the biasing force of the spiral springs 39 so that the lever 33 will be stopped on its return movement in a clockwise rotated position from that illustrated in FIGURES 3 and 5. Due to the clockwise rotated position of the lever 33 the pin 88 will be located in a position (as viewed in FIGURE 5) to the right of a line extending through members 32 and 72 so that the member 71 will be moved away from the ratchet gear 81 and the ear 83 on member 70 will be in engagement with the peripheral teeth on ratchet gear 81. Subsequent to the instant when the stepped cam face 90 of the lever 33 has moved into engagement with the entrapment needle 34 the cam lobe 55 will begin to effect upward movement of the outer free end of the mechanical transducer 57 thereby carrying with it members 70 and 71 to effect clockwise rotating movement of the ratchet gear 81. Such clockwise rotatable movement of the ratchet gear 81 will move the spur gear 73 in a counter-clockwise direction until the pin 72 has moved into alignment with the members 32 and 88. Obviously, clockwise rotatable movement of the ratchet wheel 81 will effect counter-clockwise rotatable movement of the adjusting ring 31 of the diaphragm 28 to thereby reduce the area of the diaphragm opening 29 defined by the iris blades 30. It will further be understood that after the pin 72 has been rotated to a position in alignment with members 32 and 88 that the operation of the diaphragm opening control mechanism will be the same as described in the preceding paragraph so that the area of the diaphragm opening 29 will not thereafter be varied as long as the intensity of light impinging on the photoelectric cell 25 remains constant.

Figure 6:
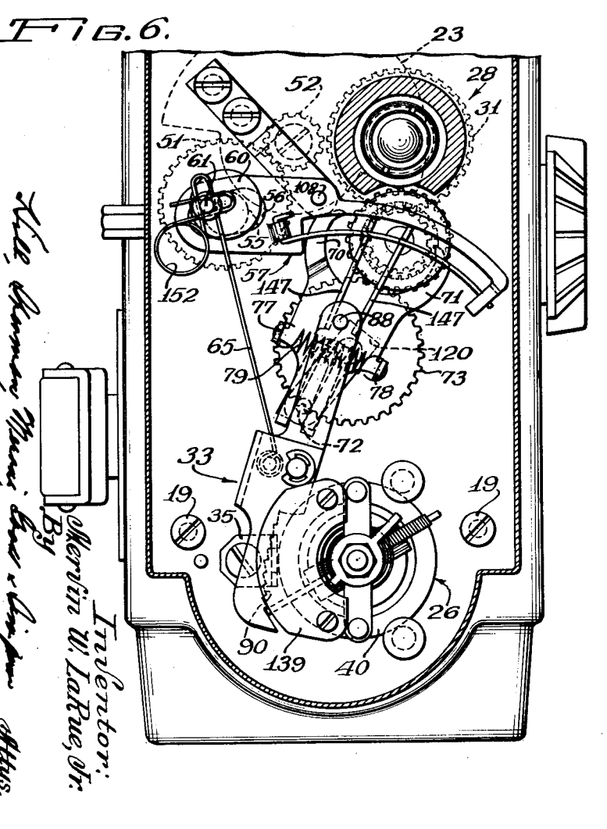
FIGURE 6 is a fragmental front elevational view which is similar in nature to FIGURE 5 and which is taken along lines V—V of FIGURE 4 but which shows various parts thereof in a different operating position.

Conversely, when the intensity of light impinging on the photoelectric cell 25 decreases substantially the operation of the diaphragm opening control mechanism will be generally as follows: After the lever 33 has been pivoted in a clockwise direction about its pivotal axis by the action of the drive wheel 60 the spring members 39 in the galvanometer 26 will act to move the entrapment needle 34 in a counter-clockwise direction until the lever 33 has again been pivoted about its pivotal axis to entrap the leg 145 of the needle 34 between the stepped cam face 90 of the lever 33 and the arcuate edges 143, 144 of members 138, 139. Due, however, to the configuration of the stepped cam face 90 of the lever 33 and the displacement of the needle 34 the lever 33 will be moved to an extreme counter-clockwise rotated position so that the pin 88 will be positioned to the left (as illustrated in FIGURE 6) of a line extending through members 32 and 72, and the ratchet ear 84 on the member 71 will be moved into engagement with the peripheral teeth on ratchet wheel 81. Subsequent to the movement of the ear 84 into engagement with the peripheral teeth on ratchet wheel 81 the outer free end of the mechanical transducer 57 will be moved upwardly by the cam lobe 55 carrying each of members 70 and 71 therewith so that the ratchet ear 84 will act to rotatably move the ratchet wheel 81 and the geared shaft 32 connected therewith in a counter-clockwise direction to thereby enlarge the area of the diaphragm opening 29 defined by the iris blades 30. Such rotatable movement of the ratchet gear 81 by the ratchet ear 84 will be effected during each revolution of the shaft 50 until the spur gear 73 has been rotated to a position wherein the pin 72 is aligned with pin 88 and shaft 32.

It is to be particularly understood that since the interval when the stepped cam face 90 of the lever 33 is out of engagement with the depending leg 145 of the entrapment needle 34 is extremely short during running of the camera, the needle will be moved through relatively small angular increments during each revolution of the shaft 50. This sluggishness in the angular displacement of the entrapment needle 34 is incorporated in the diaphragm opening control mechanism by design to render the entrapment needle relatively insensitive to movements of the camera itself. Accordingly, many revolutions of the shaft 50 would be required before the entrapment needle 34 could move from the position illustrated in FIGURE 5 to the position illustrated in FIGURE 6.

It will further be understood that due to the angular displacement of the major axis of the cam lobe 55 from the motion translation pin 61 in the drive wheel 60, the mechanical transducer 57 will not be moved pivotally in a counter-clockwise direction until one of the ratchet ears 83 or 84 has been moved into engagement with the ratchet wheel 81 or until the pin 88 has moved into alignment with the pin 72 and member 32.

Figure 7:
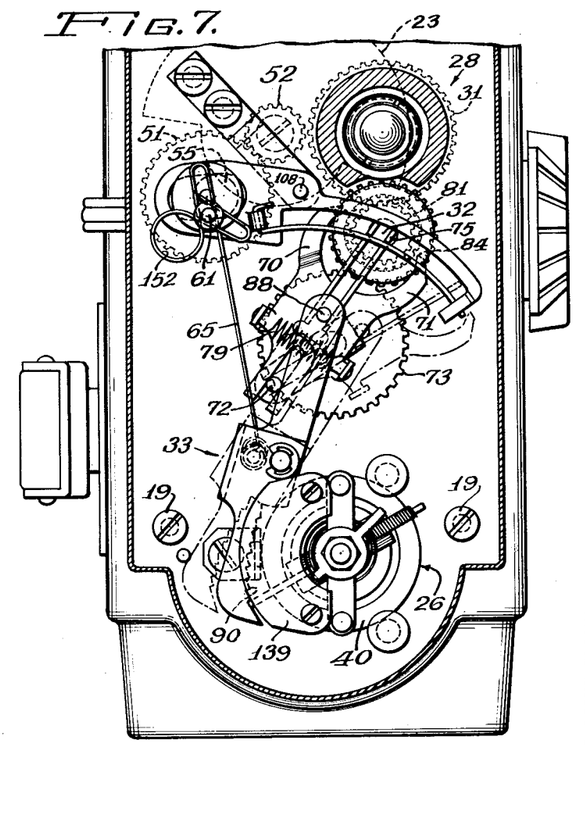
FIGURE 7 is a fragmental front elevational view which is similar in nature to FIGURE 5 and which is taken along lines V—V of FIGURE 4 but which shows the various operating parts thereof in yet another position.

FIGURE 7 has been incorporated in the appended drawings to illustrate, in broken lines, the position of various parts of the diaphragm opening control mechanism when the lever 33 is in an extreme clockwise rotated position. The lever 33 would, of course, be in this position at least once during every revolution of the shaft 50. If the entrapment needle 34 were in an extreme clockwise rotated position also, the lever 33 would then be maintained in this position regardless of reciprocation of the outer free ends of the mechanical transducer 57 or revolution of the drive wheel 60.

FIGURE 7 also illustrates, in full lines, that position which the control mechanism constantly seeks to attain wherein the members 32, 88, and 72 are in alignment with one another.

It will herein be understood that this embodiment of the invention has been used for illustrative purposes only and that various modifications and variations in the present invention may be effected without departing from the spirit and scope of the novel concepts thereof.

I claim as my invention:

1. In a photographic camera having a film exposing aperture and a diaphragm for controlling the amount of light reaching said aperture, the improvement of means for automatically adjusting said diaphragm in response to the light available comprising a photoelectric cell, a galvanometer having a pivoted circuit coil associated therewith movable in response to variations in the electrical output of said cell, said diaphragm comprising a plurality of blades movable across said aperture to close said aperture and a rotatable adjusting ring fitting about said blades operable to move said blades to vary the amount of light reaching said aperture, power means, a drive shaft rotatably movable by said power means having a drive wheel mounted thereon for corotatable movement therewith, a geared shaft drivingly connected to said adjusting ring having a ratchet wheel mounted thereon, a spur gear operably connected with said geared shaft and rotatably movable thereby, a motion translation pin eccentrically mounted on said spur gear, a pair of ratcheting members alternately engageable with said ratchet wheel to rotatably drive said wheel in opposite directions pivotally and slidably mounted on said pin, a pivoted mechanical transducer associated with said ratchet wheel operable to reciprocably move said ratcheting members adjacent the peripheral edge of said ratchet wheel in a plane substantially perpendicular to the axis thereof, a cam lobe mounted on said drive shaft and cooperable with said mechanical transducer to pivotally move said transducer, a pivoted lever for engaging and disengaging said ratcheting members from said ratchet wheel, a resilient drive connection interconnecting said lever with said drive wheel to pivotally move said lever, and abutment means connected with said circuit coil for corotatable movement therewith operable to limit pivotal movement of said lever to render said diaphragm responsive to the intensity of light impinging on said photoelectric cell.

2. In combination with a moving picture camera having a film exposing aperture and a diaphragm for controlling the amount of light reaching said aperture, the improvement of means for automatically adjusting said diaphragm in response to the light available comprising a photoelectric cell, a galvanometer electrically connected with said cell and energizable thereby and having a coil movable in response to variations in the electrical output of said cell, said diaphragm comprising a plurality of iris blades cooperable to define a diaphragm opening and an adjusting ring fitting about the outer edges of said blades and rotatable to move said blades to vary the area of the diaphragm opening, a geared shaft drivingly connected with said adjusting ring, ratcheting means associated and engageable with said geared shaft for effecting rotational movement thereof, a pivoted lever engageable with said ratcheting means and operable to engage and disengage said ratcheting means with said geared shaft, a power source operably connected with said ratcheting means for continuously operating same, resilient drive means interconnecting said power source and said lever to oscillate said lever, an abutment needle connected to and rotatable with said coil for limiting movement of said lever and positionable in the path of movement of said lever, whereby said diaphragm opening is rendered responsive to the position of said coil.

3. A combination in accordance with claim 2 wherein said ratcheting means comprises a pair of toothed fingers disposed on opposite sides of said geared shaft, and wherein said pivoted lever is engageable with each of said fingers and operable to move one or the other of said fingers relative to said geared shaft to effect ratchet motion thereof.

4. A combination in accordance with claim 2, wherein said ratcheting means comprises a pair of toothed fingers disposed on opposite sides of said geared shaft and having spring means interconnecting the said fingers to urge said fingers into engagement with said geared shaft, and wherein said pivoted lever is engageable with each of said fingers and operable to move one or the other of said fingers relatively away from the said geared shaft to cause the other of said fingers to move into engagement with said geared shaft to effect ratchet motion thereof.

References Cited in the file of this patent

UNITED STATES PATENTS

| | | |
|---|---|---|
| 2,253,055 | Tuttle | Aug. 19, 1941 |
| 2,325,463 | Axler | July 27, 1943 |
| 2,388,609 | Ericsson | Nov. 6, 1945 |
| 2,453,693 | Armstrong | Nov. 16, 1948 |
| 2,655,086 | Walker | Oct. 13, 1953 |